March 22, 1927.
F. K. MURPHY ET AL
1,621,804
FLUID OPERABLE LUBRICATOR AND FEEDER FOR ENGINES
Filed July 13, 1925
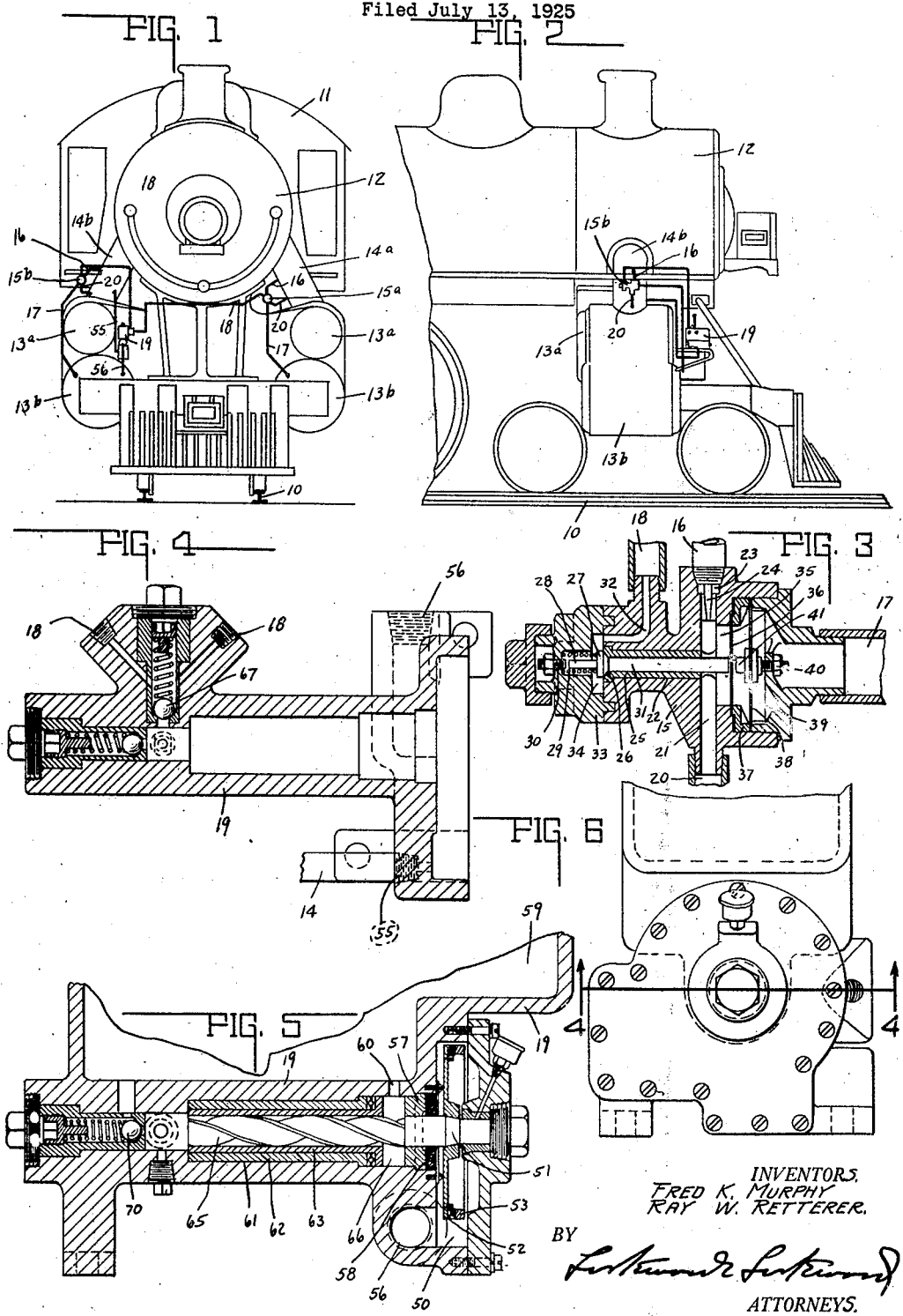
INVENTORS.
FRED K. MURPHY
RAY W. RETTERER.
BY
ATTORNEYS.

Patented Mar. 22, 1927.

1,621,804

UNITED STATES PATENT OFFICE.

FRED K. MURPHY AND RAY W. RETTERER, OF INDIANAPOLIS, INDIANA.

FLUID-OPERABLE LUBRICATOR AND FEEDER FOR ENGINES.

Application filed July 13, 1925. Serial No. 43,249.

This invention relates to a force feed lubricator and distributor for locomotives and stationary engines.

The chief object of the invention is to provide a positive supply of lubricant to an engine of the stationary or locomotive type only when the moving parts thereof are moving under the influence of fluid pressure that is doing work.

The chief feature of the invention consists in the operation of a forced feed lubricator by constantly applied fluid pressure employed in the prime mover and associating therewith a distributor of a novel character also operable by fluid pressure employed in the prime mover. In the latter instance the distributor is operable by the differential diaphragm pressures, the larger diaphragm being associated with the lower pressure which is intermittently applied.

The full nature of the invention will be understood from the accompanying drawings and the following description and claims:

In the drawings Fig. 1 is a front view of a locomotive showing the invention associated therewith, the several parts of the piping being shown diagrammatically. Fig. 2 is a side elevational view of the same. Fig. 3 is a central sectional view through the distributor. Fig. 4 is a longitudinal section through the lubricator and taken on line 4—4 of Fig. 6. Fig. 5 is a similar view taken at right angles to the figure shown in Fig. 4. Fig. 6 is an end view of the lubricator.

In the drawings 11 indicates a locomotive having a boiler 12, cylinders 13$^a$ and 13$^b$ and supply lines 14$^a$ and 14$^b$. Associated with each supply line is a distributor herein indicated respectively by the numerals 15$^a$ and 15$^b$.

Each distributor is connected by a conduit 16 to the source of high pressure steam, to wit, the conduit 14. A conduit 17 is connected to the distributor at one end and to the engine cylinder supply at the other, thus subjecting the distributor to intermittent pressure. A conduit 18 is connected to the lubricator indicated generally by the numeral 19. Said conduit 18 constitutes a high pressure lubricant supply line and serves to supply oil from the lubricator to the distributor 15. A line 20 connects the distributor to the supply line connected to the cylinder and thus the lines 16 and 20 are connected through the distributor and form a by-pass leading from and thence to the supply line 14 of the engine.

Reference will now be had to Fig. 3, wherein the details of the distributor device are shown. The body portion indicated generally by the numeral 15 includes a pair of transverse communicating channels 21 and 22. The channel 21 communicates at one end with conduit 16 and at the other end with the conduit 20. A bushing 23 has a tapered outlet or passage 24 discharging into said passage 21. The channel 22 receives a sleeve 25 which terminates at the end opposite from the end communicating with the conduit 21 in a valve seat 26. A valve 27 is associated therewith and carries a stem 28 for aligning the coil spring 29 and abutting an adjustable stop 30. The valve 27 also is extended and carries a body portion 31 that has a predetermined fit within said sleeve 25. A channel 32 communicates with conduit 18 at one end and thus the lubricator and is supplied with lubricant under high pressure. The cap 33 carried by the distributor 15 includes a valve chamber 34 and this valve chamber communicates with the conduit 21 when the valve 27 is removed from its seat 26 through the predetermined fit between the stem 31 and the sleeve 25.

The opposite end of the body 15 includes a chamber 35 in which is secured a diaphragm 36 retained in position by a retainer 37, in turn supporting another diaphragm 38, likewise retained in position within a chamber 39. An adjustable stop 40 is provided for the diaphragm 38 and a stop 41 carried by the diaphragm 38 has engagement with diaphragm 36.

The operation of the distributor device is as follows: Whenever steam is supplied to the engine cylinder, and preferably the front end, and this occurs intermittently, pressure is applied to chamber 39. Diaphragm 38 moves toward the left with abutment 41. This engages diaphragm 36 and moves the same to engage the end of the stem 31 and unseat the valve 27 from its seat 26. This permits the lubricant supplied by line 18 to pass from the valve chamber 34 to the passage 21 under high pressure.

High pressure steam also is passed through the body 15 from conduit 16 to conduit 20. Through the nozzle arrangement and jet action, the steam carries with it a predetermined amount of oil determinable by the fit and travel of stem 31 in bushing 22 and by the regulated opening of the valve, the latter being adjusted through abutment 30. When the steam pressure supplied to the chamber 39 is released by being exhausted to the atmosphere or passed into a low pressure cylinder or to accessories as is the common practice, the diaphragm 36 becomes effective and returns diaphragm 38 to its original position. Said diaphragms are limited in their travel to the right by abutment 41 and the adjustable stop 40. At the same time, the spring 29 has seated the valve 27 and the lubricant supply is discontinued. Upon failure of the steam supply it will be readily apparent that the spring 29 cuts off the lubricant supply. Thus the distributor is adapted to withhold the lubricant from the device at such times as the movable parts are not movable under fluid pressure.

Reference will now be had to Figs. 4 to 6 inclusive, wherein the lubricator 19 is illustrated in detail. Said lubricator is connected by the lines 18 to the distributor previously described. The body portion contains a chamber 50 which rotatably supports a shaft 51 which carries a wheel 52 provided with turbine vanes or blades 53 upon the periphery or side thereof. A nozzle 54 is connected by the conduit 55 to the source of high pressure steam, to-wit, the supply pipe or conduit 14. The steam, after engaging the blades and causing the turbine wheel to rotate, passes outwardly and exhausts through the port or passage 56. This is connected to the exhaust pipe of the engine or the same may be connected to a low pressure cylinder, atmosphere or to accessories as is the customary practice. The lubricator housing includes a tubular channel 61 in which is mounted by press fitting, a sleeve 62, and concentrically positioned and rotatable within the same is another sleeve 63, both sleeves being flanged and separated by a thrust bearing 64. Mounted within and secured to the sleeve 63 is a screw impeller 65 which is connected at one end to shaft 51 and is an extension thereof, a partition 57 and packing 58 separating the lubricant chamber from the turbine chamber. A supply port 60 leads from a suitable reservoir 59 carried by the lubricator housing 19 or secured thereto and discharges into a chamber 66. It is to be understood that a ball check 70 permits return flow of the lubricant from the passage 60 and chamber 66 to the reservoir for relief of excessive pressure, while a suitable ball check construction 67 prevents return flow of the high pressure lubricant from the conduits 18 to the chamber 66 when the device is stationary, Rotation of the shaft 51 by the turbine wheel rotates the screw impeller 65 and sleeve 63 to convey oil from the chamber 66, supplied by reservoir 59 through the ball check controlled passage 60, to the high pressure conduit or conduits 18 controlled by the ball check 67. Thus lubricant is supplied only when the turbine wheel is rotated. Preferably the discharge end of the lubricator is provided with a check controlled relief valve 70 communicating with the reservoir for discharging the surplus lubricant to the reservoir.

From the foregoing it will be noted that the lubricator and distributor devices are so arranged that the high pressures are all contained within enclosed casings and the lubricator and distributor parts are what may be termed directly connected together, thereby eliminating the necessity of stuffing boxes and the like heretofore required.

The invention claimed is:

1. In a lubricating system for fluid operable engines, the combination with a source of high pressure fluid, a source of lower pressure fluid, of a pressure lubricator including a screw impeller, a fluid operable turbine therefor and connected directly therewith, and a distributor connected to the lubricator and high pressure fluid source including means differentially subjected to both fluid pressure sources.

2. A lubricator including an elongated chamber open at both ends, a sleeve mounted in said elongated chamber, a screw positioned within and secured to said sleeve to prevent relative rotational movement therebetween, said chamber and the combination screw and sleeve being relatively rotatable for forming a pressure pump, and means for causing said relative rotation between the chamber and the combination screw and sleeve.

3. In a lubricator, the combination of an elongated chamber having a lateral face, a flanged sleeve mounted in said chamber, a screw impeller positioned within and secured to said sleeve to prevent relative rotational movement therebetween, said chamber and combination screw and sleeve being relatively rotatable for forming a pressure pump, a thrust bearing interposed between the lateral face of the chamber and the sleeve flange, and means for causing relative rotation between said chamber and the combination screw and sleeve.

4. In a lubricating system for fluid operable engines, the combination with a source of high pressure fluid and a source of lower pressure fluid, of a pressure lubricator, a fluid operable turbine therefor, and a distributor connected to the lubricator and the high pressure fluid source including mean differentially subjected to both fluid pressure sources.

5. In a lubricating system the combination of a valve, a reciprocable stem therefor, a passage controlled by the valve and substantially occupied by the stem, a supply chamber communicating with one end of the passage by way of the valve, a restricted fluid pressure supplying passage communicating with the other end of said first mentioned passage, and reciprocable differential pressure operable means for actuating said valve.

6. In a lubricating system the combination of, a valve, a reciprocable stem therefor, a passage controlled by the valve and substantially occupied by the stem, a supply chamber communicating with one end of the passage by way of the valve, a restricted fluid pressure supplying passage communicating with the other end of said first mentioned passage, reciprocable differential pressure means in axial alignment with said valve for actuating the same, and adjustable stops at opposite ends of the stem and reciprocable means for limiting reciprocable movement in opposite directions.

In witness whereof, we have hereunto affixed our signatures.

FRED K. MURPHY.
RAY W. RETTERER.

DISCLAIMER.

1,621,804.—*Fred K. Murphy* and *Ray W. Retterer*, Indianapolis, Ind. FLUID-OPERABLE LUBRICATOR AND FEEDER FOR ENGINES. Patent dated March 22, 1927. Disclaimer filed October 6, 1928, by the patentees.

Hereby disclaim in the before mentioned Letters Patent claims 4, 5, and 6 thereof, since these should have been issued in Patent No. 1,620,911 in view of the decision in the *National Electric Company* v. *Automatic Company*, 15 Fed. (2d) 257, and by reason of the allowance of the same identical claims in the application for reissue of said Patent No. 1,620,911, and your petitioners specifically disclaim these claims in Patent No. 1,621,804 from the date of the granting of the reissue of Patent No. 1,620,911 upon application Serial No. 297,205, and your petitioners also request that this disclaimer be entered and be published in the same OFFICIAL GAZETTE and on the same day as the reissue patent is granted and published.

[*Official Gazette October 23, 1928.*]